United States Patent
Kim et al.

(10) Patent No.: US 8,214,698 B2
(45) Date of Patent: Jul. 3, 2012

(54) SOLID STATE STORAGE SYSTEM WITH IMPROVED DATA MERGING EFFICIENCY AND CONTROL METHOD THEREOF

(75) Inventors: Young Ho Kim, Gyeonggi-do (KR); Kyeong Rho Kim, Gyeonggi-do (KR); Myung Suk Lee, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 102 days.

(21) Appl. No.: 12/648,346

(22) Filed: Dec. 29, 2009

(65) Prior Publication Data
US 2011/0055623 A1    Mar. 3, 2011

(30) Foreign Application Priority Data
Sep. 3, 2009    (KR) .................. 10-2009-0082993

(51) Int. Cl.
G11C 29/24    (2006.01)
G11C 29/56    (2006.01)

(52) U.S. Cl. ........................................ 714/710; 714/702

(58) Field of Classification Search .................. None
See application file for complete search history.

(56) References Cited

U.S. PATENT DOCUMENTS

| | | | |
|---|---|---|---|
| 6,973,531 B1 | 12/2005 | Chang et al. | |
| 7,434,122 B2 | 10/2008 | Jo | |
| 2006/0013048 A1* | 1/2006 | Kim | ............................ 365/200 |
| 2009/0040827 A1 | 2/2009 | Kim | |
| 2009/0150597 A1* | 6/2009 | Yang et al. | ..................... 711/103 |
| 2009/0310408 A1* | 12/2009 | Lee et al. | ................. 365/185.03 |

FOREIGN PATENT DOCUMENTS

| | | |
|---|---|---|
| KR | 1020060006554 A | 1/2006 |
| KR | 1020080066959 A | 7/2008 |

* cited by examiner

*Primary Examiner* — Jeffrey A Gaffin
*Assistant Examiner* — Dipakkumar Gandhi
(74) *Attorney, Agent, or Firm* — Ladas & Parry LLP

(57) ABSTRACT

The presented solid state storage system provides an efficient manner of processing read and write operations in a memory block that has a faulty page of memory within it. The solid state storage system includes a flash memory area and a memory controller. The memory controller stores link information into a buffer, allocates a first temporary physical block to resume operations of the bad block past the first bad page, updates and stores mapping information associated with the remaining portions of the bad block past the first bad page, and merges together those valid pages from among the bad block into a final physical block by merging together all prior successfully operated valid pages from among the bad block with any subsequently successfully operated valid pages which are associated with successful operations subsequently to the failure in the first bad page of the bad block.

3 Claims, 4 Drawing Sheets

T1 Operation failed, Process physical block into temporary block
T2 Resume operation in new block
T3 Copy only valid pages of temporary and correspondent blocks while merging data
T4 Process temporary block into bad block T1 Operation failed, Process physical block into temporary block
T2 Resume operation in new block
T3 Copy only valid pages of temporary and correspondent blocks while merging data
T4 Process temporary block into bad block // SOLID STATE STORAGE SYSTEM WITH IMPROVED DATA MERGING EFFICIENCY AND CONTROL METHOD THEREOF

CROSS-REFERENCES TO RELATED APPLICATION

The present application claims priority to Korean application number 10-2009-0082993, filed on Sep. 3, 2009, which is incorporated by reference in its entirety as set forth in full.

BACKGROUND

1. Technical Field

Embodiments of the present invention relate generally to a solid state storage system and its control method, and more particularly, to a solid state storage system and a control method thereof.

2. Related Art

Nonvolatile memories are widely employed as storage units in portable information apparatuses. In recent years, there have been proposed solid state drives or disks (SSDs) using NAND flash memories instead of hard disk drives (HDDs) in personal computers, rapidly encroaching the market of HDDs.

Such types of a solid state drives (hereinafter, referred to as "solid state storage system") are likely to employ flash memories that include a plurality of memory areas in which each memory area is composed of plural pages. As is well known, in a flash memory, operations for reading and writing are executed in the unit of page. To update data of a page, the data is written therein after erasing the block including the page to be updated.

Since semiconductor fabrication processes are carried out in microscopic dimensions, defects can occur when manufacturing the large numbers of flash memory cells. In addition, physical defects can also be caused by gradual degradation processes that arise from the myriad of write operations that occur because write operations usually require high voltages to be applied at memory cells. For those and other reasons, it would be impossible to correctly write predetermined data into a page having such a physical defect. Accordingly, if a failure in the write operation has occurred in a physical defect area rather than an operational margin, then it is preferable that the block which includes the physical defective page should be identified, treated and/or avoided as a bad block.

FIG. 1 schematically shows a general sequence of processing a bad block.

Referring to FIG. 1, an operation failure in a physical block 1 is shown to be due to a physical defect while performing a writing operation of new data therein. In this case, another physical block 2 must be allocated thereto instead of the physical block 1 in which the operation fail has occurred. Then, only valid pages of the physical block 1 are copied into the physical block 2 and the physical block 2 is processed into a bad block. Processing the physical block 1 as a bad block is to essentially exclude the physical block 1 from subsequent block allocations so that the bad block is not used afterwards. During this process, in addition to excluding the defective pages of the physical block 1, it is also necessary to copy data from the non-defective pages of the physical block into the physical block 2. These copying operations are carried out in units of pages and as a result lengthens the data processing time.

SUMMARY OF THE INVENTION

Embodiments of the present invention provide a solid state storage system capable of merging data.

Embodiments of the present invention provide a control method of controlling a solid state storage system to merge data. In one embodiment of the present invention, a solid state storage system includes: a memory area including a plurality of memory block, and a memory controller configured to regard a first physical block in which a failure is occurred as a temporary block, wherein the first physical block has a first data which was programmed before the failure is occurred and the first data includes a first logical page address, wherein the memory controller is configured to program a second data into a second physical block, as a new physical block and the second data includes a second logical page address in succession to the first logical page address.

In another embodiment of the present invention, a solid state storage system includes: a flash memory area configured to include a plurality of memory blocks; a buffer configured to store address mapping and location information of the memory block; and a memory controller configured to control a bad block of the memory blocks and a new physical block, which is associated with the bad block, to link together by a logical address so as to provide an virtual logical block and configured to control information of the link to be stored in the buffer. In yet another embodiment a control method is envisioned of a solid state storage system, such that the method comprises: performing operations on a flash memory area including a plurality of memory blocks; storing address mapping and location information of the memory blocks in a buffer; storing link information of a prior valid page into the buffer wherein the prior valid page is that page in the first bad block which was successfully operated on immediately prior to the failure in the first bad page; allocating a first physical block to resume operations of the bad block past the first bad page by copying all remaining portions of the bad block past the first bad page into the first physical block; updating and storing mapping information of logical and physical addresses in the buffer as a first link index such that the first link index is associated with the remaining portions of the bad block past the first bad page which are copied in the first physical block; and merging together only those valid pages from among the bad block into a final physical block by merging together all prior successfully operated valid pages from among the bad block which are associated with successful operations prior to the failure in the bad page of the bad block to be merged with any subsequently successfully operated valid pages which are associated with successful operations subsequently to the failure in the first bad page of the bad block.

In still another embodiment of the present invention, a control method of a solid state storage system is comprised of: determining whether an operation requested externally has been failed; processing a bad block, which is failed in the requested operation, into a temporary block and controlling to resume the failed operation by allocating a new block; and copying only valid pages of the new block and the temporary block while merging data. In still yet another embodiment the solid state storage system comprises: a flash memory area comprising a plurality of memory blocks; and a memory controller configured to control a failure associated with a first bad page in a bad block of the memory blocks, the memory controller configured to store link information of a prior valid page into a buffer wherein the prior valid page is that page in the first bad block which was successfully operated on immediately prior to the failure in the first bad page, the memory controller is configured to allocate a first physical block to resume operations of the bad block past the first bad page by copying all remaining portions of the bad block past the first bad page into the first physical block, the memory controller is configured to update and to store mapping information of logical and physical addresses in the buffer as a first link index such that the first link index is associated with the remaining portions of the bad block past the first bad page which are copied in the first physical block, and the memory controller is configured to merge together only those valid pages from among the bad block into a final physical block by merging together all prior successfully operated valid pages from among the bad block which are associated with successful operations prior to the failure in the bad page of the bad block to be merged with any subsequently successfully operated valid pages which are associated with successful operations subsequently to the failure in the first bad page of the bad block.

BRIEF DESCRIPTION OF THE DRAWINGS

Features, aspects, and embodiments are described in conjunction with the attached drawings, in which.

DETAILED DESCRIPTION OF THE PREFERRED EMBODIMENTS

Hereinafter, a semiconductor memory apparatus and a test method thereof, according to the present invention, will be described below with reference to the accompanying drawings through exemplary embodiments.

A solid state storage system according to an embodiment of the present invention will be explained in conjunction with FIG. 2.

Figure 1:
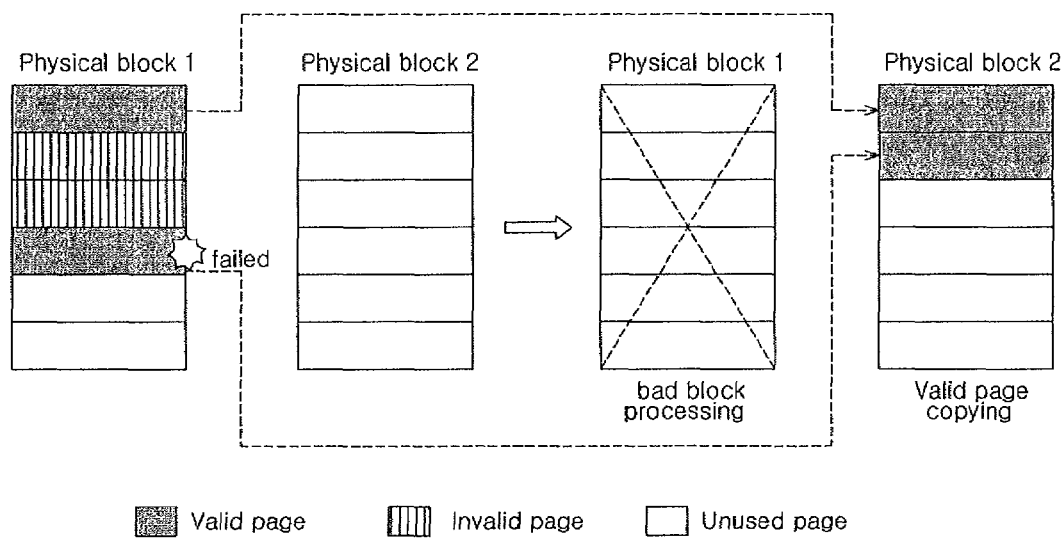
FIG. 1 is a schematic diagram showing a general sequence of processing a bad block.
Figure 2:
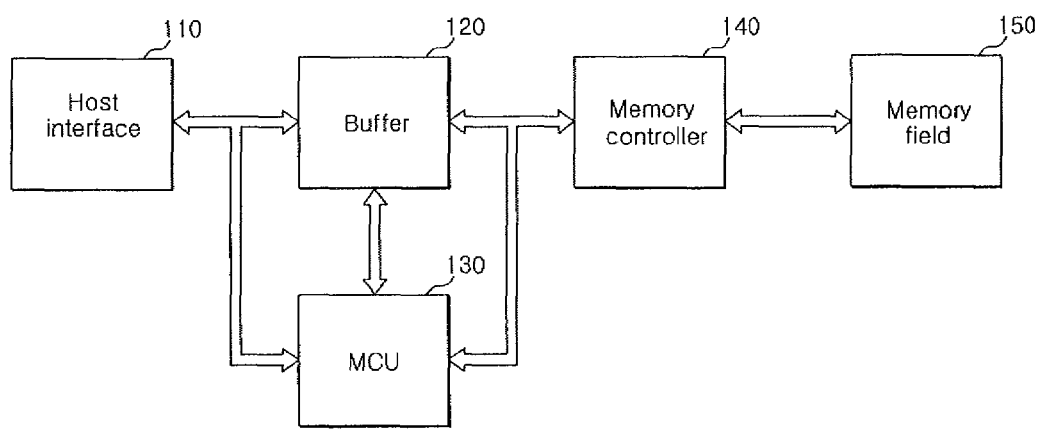
FIG. 2 is a block diagram of a solid state storage system according to an embodiment of the present invention.

FIG. 2 illustrates a block organization of the solid state storage system embodied in the present invention. Here, the solid state storage system 100 of FIG. 2 is exemplarily reduced in a storage system employing NAND flash memories.

Referring to FIG. 2, the solid state storage system 100 may comprise a host interface 110, a buffer 120, a micro-control unit (MCU) 130, a memory controller 140 and a memory area 150.

The host interface 110 is coupled to the buffer 120. The host interface 110 enables an external host (not shown) and the buffer 120 to transmit and receive control commands, address signals and data signals between each other. An interface mode between the host interface 110 and the external host may be one of serial advanced technology attachment (serial ATA; SATA), parallel ATA (PATA), small computer system interface (SCSI), express card, and peripheral component interconnect (PCI)-express.

The buffer 120 functions by buffering output signals from the host interface 110, or temporarily stores mapping information between logical and physical addresses, block allocation information of the memory area 150, and data received from an external system (e.g., the external host). The buffer 120 may be formed by using a static random access memory (SRAM).

The MCU 130 may transmit and receive control commands, address and data signals with the host interface 110, or control the memory controller 140 by using these control commands and signals.

The memory controller 140 selects one from a plurality of NAND flash memories of the memory area 150 and provides a command to the selected NAND flash memory for writing, erasing or reading. If there is a bad block, the memory controller 140 takes a link index from address mapping information that is involved in the final operation of the bad block. That is, when a bad block occurs then the memory controller 140 allocates a new block thereto and assigns the new block a new logical address that is subsequent to the former logical address of that bad block. Thereby, according to this embodiment of the present invention, logical addresses of different blocks link up with each other which results in an virtual logical block.

In the memory area 150, data are written, erased or read under control by the memory controller 140. The memory area 150 may be made up of a NAND flash memory. Further, while this embodiment shows a multi-level cell (MLC) NAND flash memory as an example for convenience of description, it may not be restrictive hereto. The memory area 150 may comprise a plurality of chips having multiple blocks in which each chip includes a number of pages.

Figure 3:
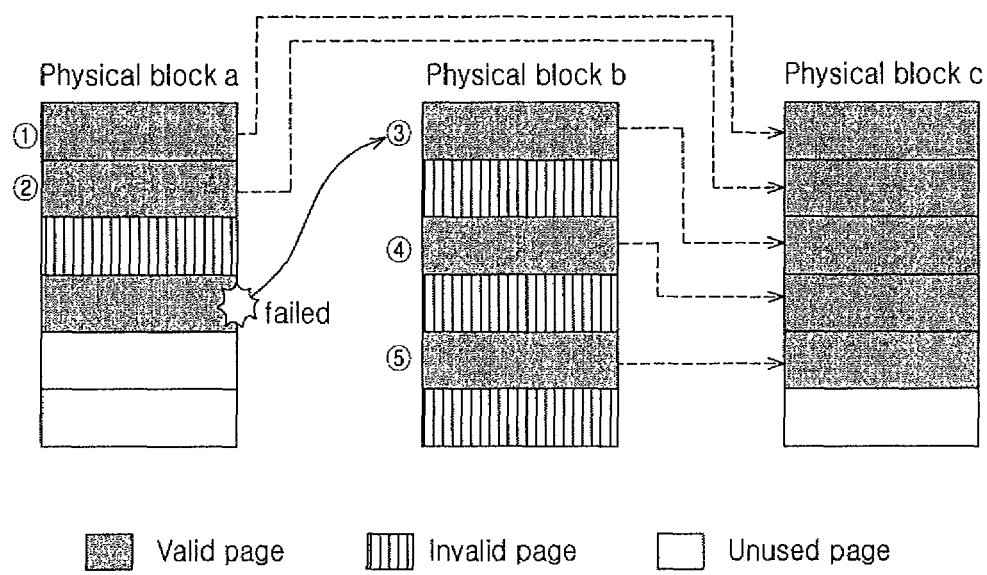
FIG. 3 is a schematic diagram showing a sequence of processing a bad block in the solid state storage system of FIG. 2.

FIG. 3 is a conceptual block diagram of a sequence of processing a bad block in the solid state storage system 100 according to FIG. 2.

Referring to FIG. 3, a physical block 'a' is depicted storing valid and invalid data in a plurality of pages. Logical addresses ① and ② of the physical block 'a' are signs for conceptually representing logical addresses. Now a data merging process with this physical block along time will be described as follows.

The status shown in FIG. 3 is that type of situation that occurs when an operation failure arises which is brought about by a physical defect in a memory cell while conducting a requested operation for a page corresponding to a logical address ③ of the physical block 'a' in compliance with an external request at a time T1. The requested operation includes read and write operations. Determining whether or not the requested operation has failed is to find out if there still is a failed bit even after a repairing process by an error check code (ECC). In this case, the memory controller 140 stores logical address information of a page, in which the final operation of the physical block 'a' is executed, in the buffer 120 by the link index. Additionally, the memory controller 140 enables data and address mapping information of the valid pages (i.e., the pages corresponding to ① and ②) of the physical block 'a' to be temporarily stored in the buffer 120 for a predetermined time, by processing the physical block 'a' to a temporary block instead of processing the physical block 'a' to a bad block as in the conventional prior art case. Creating the link index is accomplished by means of logical address and block information of the last valid page of the physical block 'a' that is processed to be a temporary block. The link index acts as a reference flag signal for setting an arrangement of pages of a temporary block and a current physical block, as well as, merging a temporary block with the newly allocated physical block.

Next, at a time T2, a new physical block 'b' is allocated for use in resuming the operation that has failed in the physical block 'a'. Here, mapping information with logical and physical addresses of the physical block 'b' is also updated and stored in buffer 120 together with block information of the physical block 'b'. Hereafter, all operations requested by an external system will be executed in the physical block 'b'.

Thereby, data of a page corresponding to the logical address ③ of the physical block 'a' is processed in the physical block 'b' and has a new physical address and a new physical block address. But, with the link index stored in the buffer 120, the page corresponding to the logical address ③ of the physical block 'b' is able to link up with pages corresponding to the logical addresses ① and ② of the physical block 'a'.

At time T3, data of valid pages are merged together by the memory controller 140 which first allocates a new physical block 'c'. The memory controller 140 then copies only valid pages into the physical block 'c' from the physical block 'a', which has been processes to a temporary block, and copies the physical block 'b' currently corresponding thereto.

At time T4, the memory controller 140 processes the physical block 'a', which has been a temporary block, as being a bad block that is disabled in use.

In this manner, only pages that have failed in a requested operation are controlled to be active in a new block. On the other hand, data and address information of valid pages, which have already been stored in the failed block, are substantially maintained. Therefore, this manner of writing or reading data is effective for reducing a total data processing time because a copying operation is only executed for substantially failed pages without the need to performing unnecessary copying steps for valid pages that have been previously existed before an operation failure has occurred.

Figure 4:
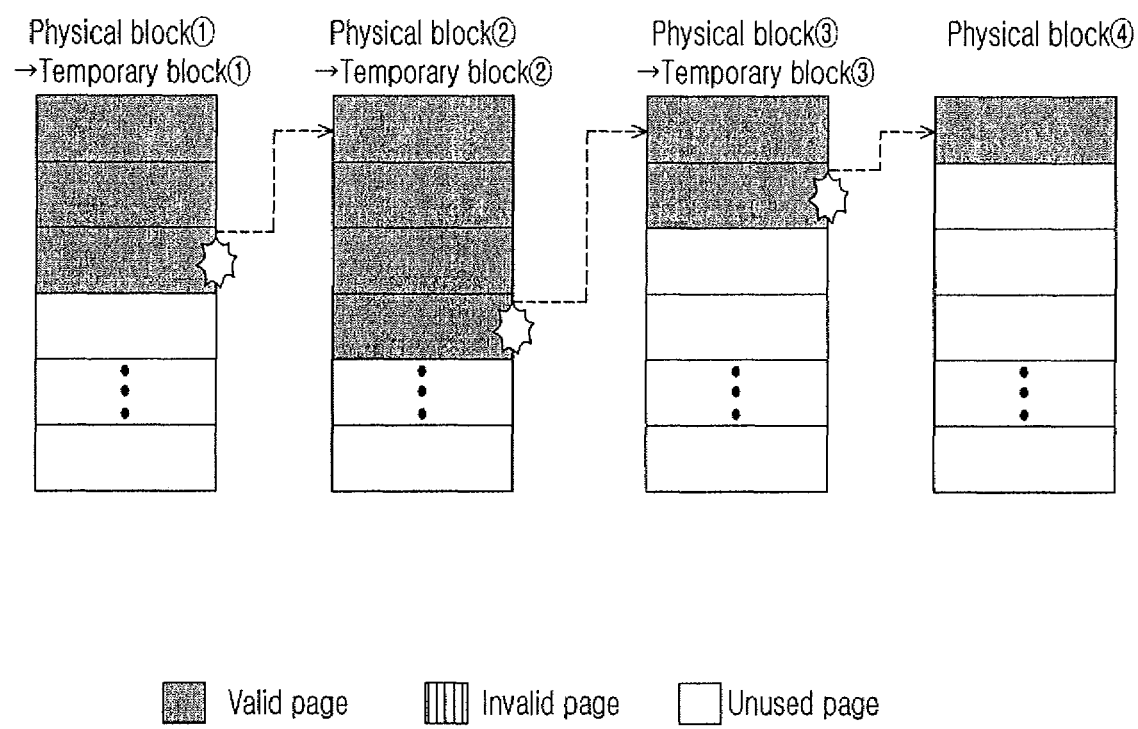
FIG. 4 is a schematic diagram showing a sequential link control scheme with blocks according to FIG. 3.

FIG. 4 schematically illustrates a sequential link control scheme with blocks according to FIG. 3.

From FIG. 4, it can be seen how to sequentially control the link index when an operation failure occurs in every new block allocated thereto.

First, if a requested operation has failed in a first physical block ①, the first physical block ① is processed to be a first temporary block ① so as to retain mapping information of valid pages which has existed prior to the operation failure. At the same time, a logical address of a page where the failed operation has occurred is stored as a first link index in the buffer 120.

Next, a second physical block ② is allocated to resume the failed operation of the first physical block ①. When the requested operation, which has already once failed in the first physical block ①, fails in the second physical block ②, then address mapping information existed before the operation fail of the second physical block ② is retained in itself and the second physical block ② is processed to be a second temporary block ②. Further, the logical address corresponding to the failed operation is stored as a second link index. During this, the first link index is continuously retained in the buffer 120.

Subsequently, a third physical block ③ is newly allocated, as described above, to further resume the requested operation that has already failed in the respective first and second physical blocks ① and ②. If the requested operation also fails even in the third physical block ③, a third link index is created to process the third physical block ③ into a third temporary block ③. Then, a fourth physical block ④ is further allocated thereto as a new block for the purpose of completing the failed operation.

By doing this in accordance to one embodiment, when a failure occurs in an operation in newly allocated blocks, it is possible to arrange pages of the different blocks as a logical block by means of plural link indexes. Thus, it is possible to realize a reduction in the operational burden when copying all valid pages whenever a bad block is generated, or it is possible to realize a reduction in the overhead of unnecessary page copying.

Figure 5:
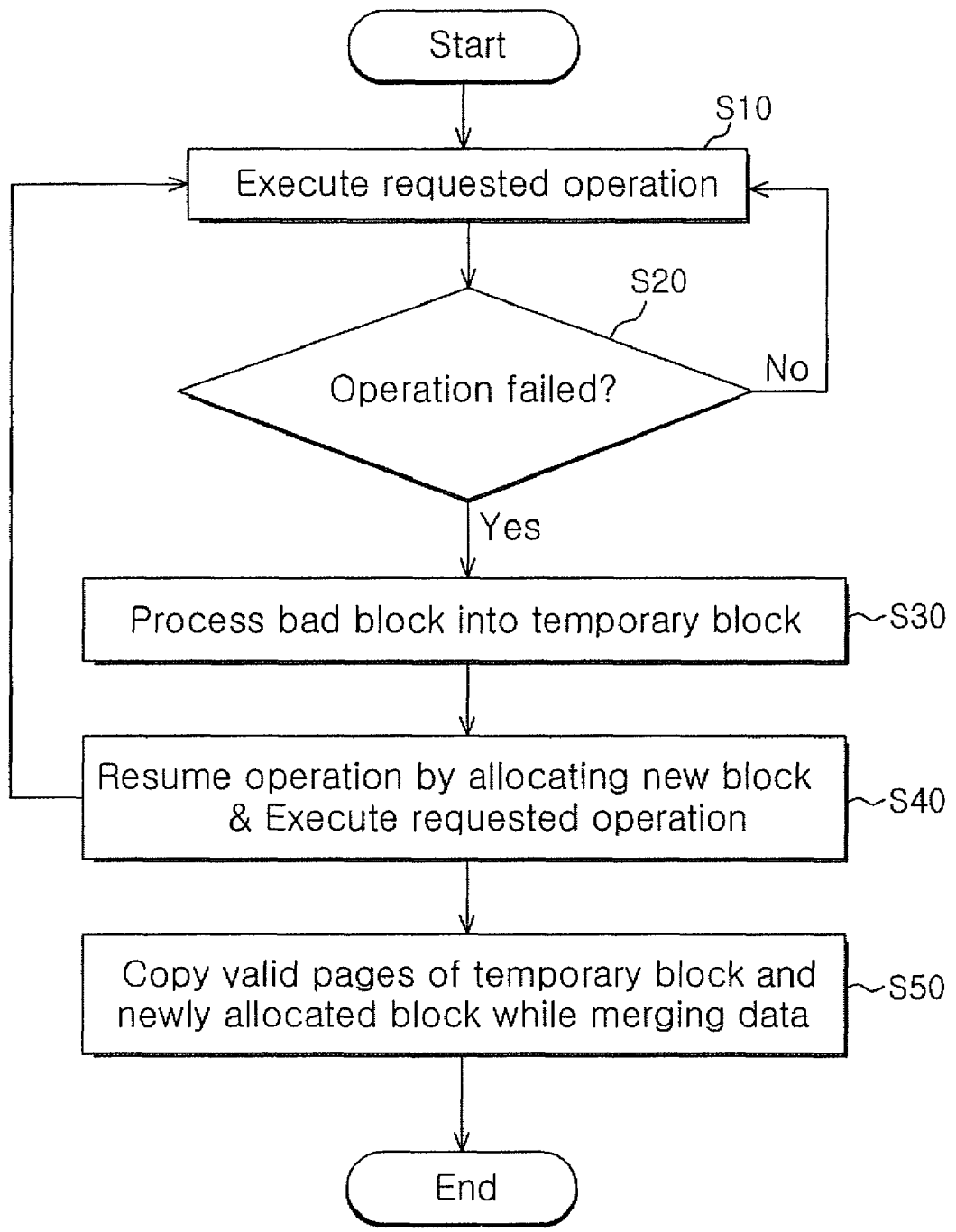
FIG. 5 is a flow chart showing a control method of the solid state storage system according to an embodiment of the present invention.

FIG. 5 shows an operating flow of controlling the solid state storage system 100 shown in FIG. 2.

Referring to FIGS. 2 through 5, first, an externally requested operation, e.g., a read or a write operation, is executed in a selected block (S10).

If the requested operation fails in the selected block (Yes), then the failed block is processed to be a temporary block (S30). While processing the failed block into the temporary block, address mapping information of previous valid pages of the failed block is substantially maintained and a link index is stored in the buffer 120 by way of a logical address corresponding to the failed block.

A new block is then allocated, instead of the temporary block, to resume the requested operation that has been failed and all operations requested afterward are controlled to be executed in the new block (S40).

In merging data, only valid pages of the temporary block and the newly allocated block are copied (S50). During this step, by referring to the link index, data storage orders are substantially maintained of the temporary block and the current block.

As described above, it is possible to realize a reduction in the data processing time by processing a failed block into a temporary block while substantially maintaining address mapping information of valid pages, and creating link indexes for locations to valid pages of a newly allocated block.

What is claimed is:

1. A solid state storage system comprising:
   a memory area including a plurality of memory blocks;
   a buffer configured to store address mapping and location information of the memory blocks; and
   a memory controller configured to control a failure associated with a first bad page in a bad block of the memory blocks, the memory controller configured to store link information of a prior valid page into the buffer wherein the prior valid page is that page in the bad block which was successfully operated on immediately prior to the failure in the first bad page,
   the memory controller is configured to allocate a first physical block to resume operations of the bad block past the first bad page by copying all remaining portions of the bad block past the first bad page into the first physical block,
   the memory controller is configured to update and to store mapping information of logical and physical addresses in the buffer as a first link index such that the first link index is associated with the remaining portions of the bad block past the first bad page which are copied in the first physical block, and
   the memory controller is configured to merge together those valid pages from among the bad block into a final physical block by merging together all prior successfully operated valid pages from among the bad block which are associated with successful operations prior to the failure in the bad page of the bad block to be merged with any subsequently successfully operated valid pages which are associated with successful operations subsequently to the failure in the first bad page of the bad block.

2. The solid state storage system according to claim 1, wherein the memory controller is configured to allocate a second physical block to resume operations of the bad block past a second bad page in the bad block by copying all remaining portions of the bad block past the second bad page into the second physical block, and
   the memory controller is configured to update and to store mapping information of logical and physical addresses in the buffer as a second link index such that the second link index is associated with the remaining portions of the bad block past the second bad page which are copied in the second physical block.

3. The solid state storage system according to claim 2, wherein the memory controller is configured to allocate a third physical block to resume operations of the bad block past a third bad page in the bad block by copying all remaining portions of the bad block past the third bad page into the third physical block, and
the memory controller is configured to update and to store mapping information of logical and physical addresses in the buffer as a third link index such that the third link index is associated with the remaining portions of the bad block past the third bad page which are copied in the third physical block.

* * * * *